July 16, 1968
L. BALAMUTH ET AL
3,392,721
ULTRASONIC HEATING APPARATUS
Original Filed Oct. 8, 1962
3 Sheets-Sheet 1
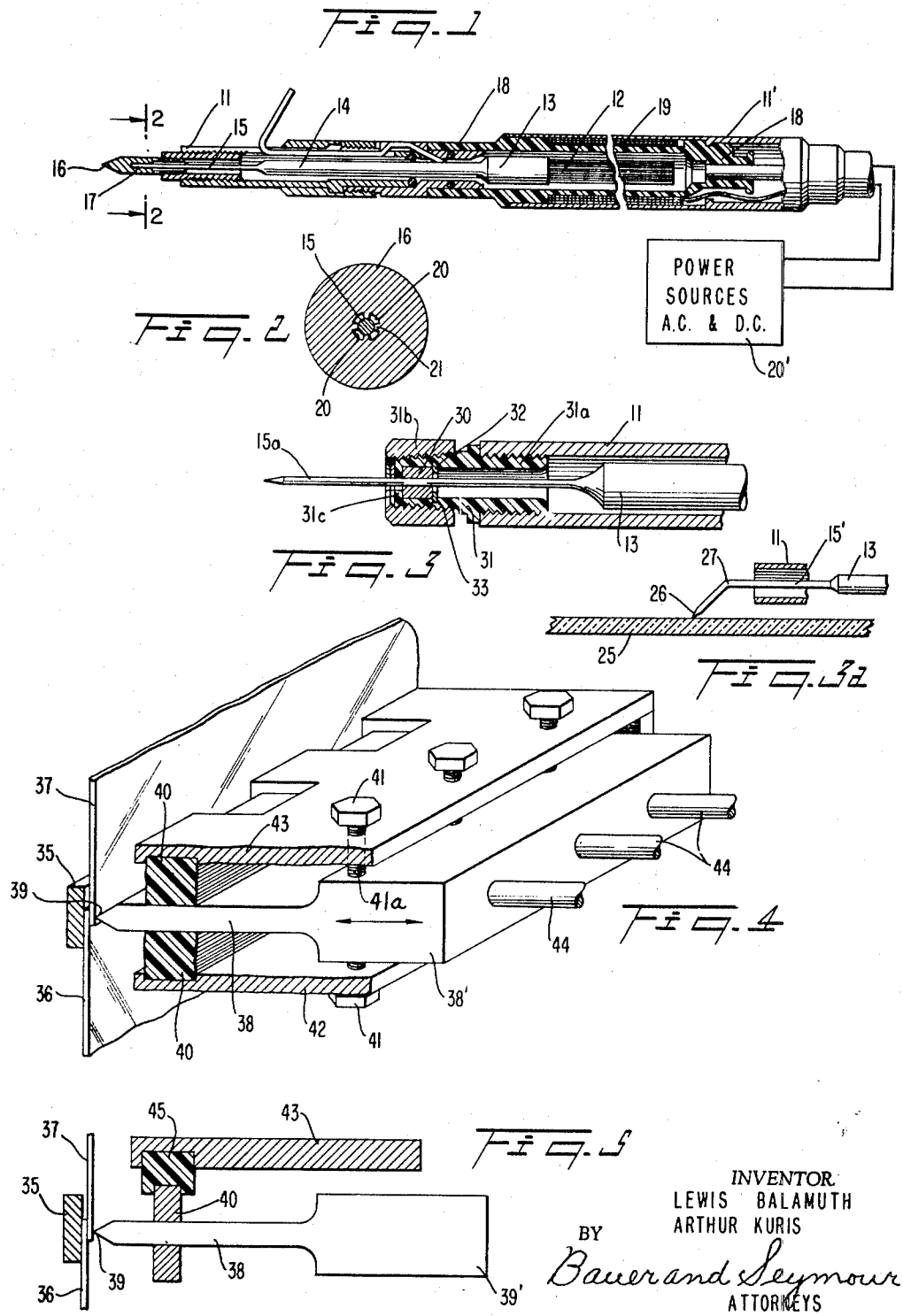
INVENTOR.
LEWIS BALAMUTH
ARTHUR KURIS
BY
Bauer and Seymour
ATTORNEYS

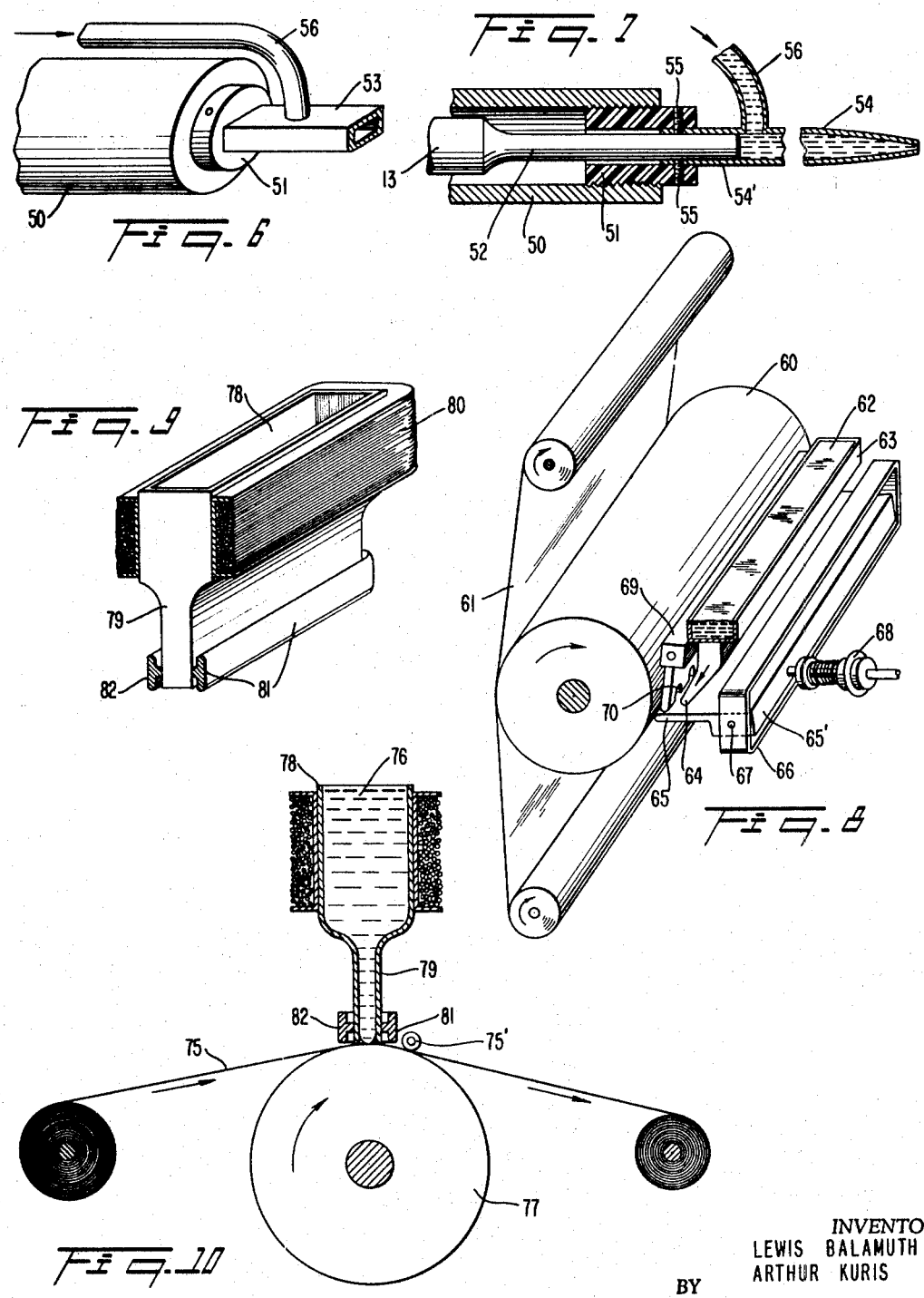

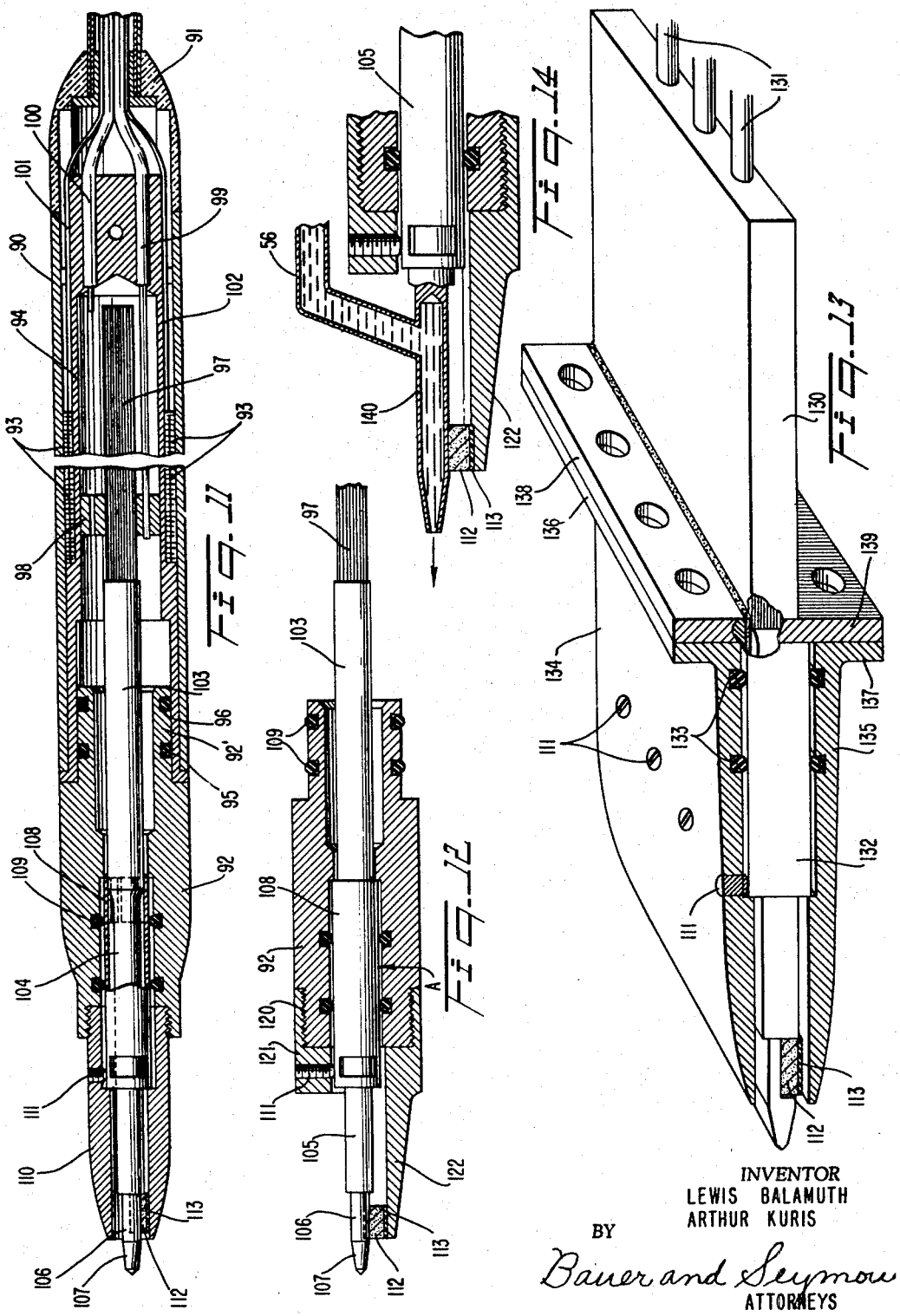

United States Patent Office 3,392,721
Patented July 16, 1968

3,392,721
ULTRASONIC HEATING APPARATUS
Lewis Balamuth, New York, and Arthur Kuris, Riverdale, Bronx, N.Y., assignors to Cavitron Corporation, a corporation of New York
Original application Oct. 8, 1962, Ser. No. 228,803, now Patent No. 3,321,558, dated May 23, 1967. Divided and this application Sept. 15, 1966, Ser. No. 579,580
18 Claims. (Cl. 126—247)

ABSTRACT OF THE DISCLOSURE

A frictional heating device which derives its effect from rubbing contact with the body of the tool is added to an apparatus having a tool which acts by high frequency and low amplitude to do work, such as drilling holes, cutting, bonding and polishing surfaces, upon solid materials.

This is a division of application Ser. No. 228,803, filed Oct. 8, 1962, now Patent No. 3,321,558.

This invention relates to a new apparatus for heating objects, particularly fine objects, by high frequency techniques. The invention is particularly concerned with the generation of heat, the reduction of viscosity, and the reduction of surface tension in thermosoftening bodies as they are applied or are prepared for application.

The invention involves a source of ultrasonic energy readily capable of producing microscopic or minute proportions at the operative end. The invention is readily adapted to the developing field of micro technology, for instance in transistor development and especially to the new mesa type transistors where leads are to be attached to areas measured in thousandths of an inch.

It is an object of the invention, using micro techniques, to develop heat at the point of use. Another object is to simultaneously develop heat and apply vibrational forces of high frequency and low amplitude where material is undergoing working. Another object is to solder, weld or braze objects together, particularly objects of small size, and to do this, if need be, through a protective shield. Another object is to seal plastic materials by self-bonding or by adhesion to other materials. Another object is to apply coatings to sheets such as wax to paper, and ink to printing rollers. Another object is to extrude thermosoftening materials, particularly resinous thermoplastics and metals. Another object is to feed fluid materials through orifices of such size that the forces of capillarity do not ordinarily permit their passage, and another object is to fluidify such materials as they are ejected from such orifices. Another object is to shape and form metal.

The objects of the invention are accomplished, generally speaking, by softening a stiff, thermosoftening material by forcing it under slight pressure into a conduit having a discharge part of capillary dimensions, and heating the conduit and its contents by vibrating them at high frequency and low amplitude against a frictional body at a location adjacent the discharge part. The apparatus for accomplishing this comprises an element, means mounted so as to have frictional sliding engagement with the element, and means to vibrate at a high frequency and low amplitude at least one of the elements and the means relative to the other, so as to generate substantial heat at the zone of frictional engagement.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a view mainly in vertical section through a tool of known type capable of delivering vibrations of high frequency and low amplitude, but including a novel tool heated by the novel process of generating heat;

FIG. 2 is a section on line 2—2 of FIG. 1 in the direction of the arrows;

FIG. 3 is a vertical section through a novel form of hot needle including novel means for heating it;

FIG. 3a is a vertical section through the end of a vibrator of the type of FIG. 1 illustrating a method of generating heat and of applying energy simultaneously at a selected point;

FIG. 4 is a perspective view partly in vertical section through an apparatus for sealing the overlapping edges of thermoplastic bodies;

FIG. 5 is a detail of part of FIG. 4 taken in end view, with modification;

FIG. 6 is a perspective view of the apparatus of FIG. 7 which softens and delivers materials to stiff consistency;

FIG. 7 is a vertical cross section through an apparatus similar to FIG. 6 embodying certain modifications;

FIG. 8 is a perspective view, partly in section, of an apparatus for coating a sheet of substantial width;

FIG. 9 is a perspective view partly in section of a device for softening a thermosoftening material, for simultaneously heating it, and for delivering it vertically, for instance as in supplying printing ink to a roller;

FIG. 10 is a vertical section through a device similar to FIG. 9 employed in the coating of paper;

FIG. 11 is a longitudinal section through a preferred soldering iron;

FIG. 12 is a modified detail of the tip construction of the iron of FIG. 11;

FIG. 13 is a sectioned perspective of a sealing device constructed on the principles of FIG. 12;

FIG. 14 is a section through a modification of the delivery device of FIGS. 6 and 7;

FIG. 15 is a fragmentary elevation in part, section taken from the parent case, illustrating the use of the vibrations of this invention to generate heat in a metal die.

There has been described an apparatus which is capable of generating vibrations of high frequency and low amplitude, and in issued Patent No. 2,990,616 some of the operating characteristics of a similar tool are given. Satisfactory operating ranges are found in the range of frequencies from a few thousand to a few hundred thousand, and in the range of amplitudes from a hundredth of an inch to the ten-thousandths of an inch.

In the tool shown in FIG. 1 a housing 11 contains a transducer 12 which is composed of laminated nickel layers attached at one end to a mechanical amplifier 13 which has two stages of amplification 14 and 15, the stage 15 constituting a pin which has moving, frictional contact with a recess 17 in a copper tip 16. The copper tip is firmly mounted in the housing 11 which also supports a plastic liner 18 which supports a winding 19 which receives D.C. and A.C. current from power source 20'. When the power sources are turned on, a transducer imparts minute longitudinal vibration of high frequency and low amplitude to the end of mechanical amplifier 13 to which it is attached. The reduced section of the amplifier 14 magnifies the amplitude and the reduced section 15 still further magnifies it. There is thus set up a frictional, internal heating of the tip 16 by contact of the friction pin 15 with the wall of the recess 17. If the pin 15 is allowed to strike against the end of recess 17 it will impart vibration to the tip 16, but if it does not strike the end of the recess its function will be largely thermal. In this way there is provided the internal heating of the tip of a soldering tool to a temperature which is adequate to the melting of solder.

The internal construction of the tip 16 is shown in FIG. 2. The tip is internally provided with grooves 20 separated by lands 21 which frictionally engage the pin 15. The friction generated between the vibrating pin and the lands is sufficient to heat the copper tip to the region 700 to 800° F., which is adequate for the melting of solder. This tool is particularly useful in the micro soldering of tips on transistors where the area of soldering occupies only a few thousandths of an inch.

In FIG. 3a is illustrated a novel method and apparatus for engraving. In this figure the number 25 illustrates a piece of glass, or other hard material capable of being scored by the engraving tool, to which is applied the hard point 26 of a bent engraving tool 27 which is formed on the end 15' of a mechanical amplifier 13 which is driven as described in connection with FIG. 1. The end of the housing 11 does not engage the engraving tool, which is free to vibrate at the frequency and with the amplitude provided by the tool. If the tool holder input has a stroke of .0003 inch, imparted by an exciting current of a D.C. bias plus 20,000 cycles per second A.C. in the winding, the vertical stroke output of the tool may be in the vicinity of .001 inch. The heating generated by the contact of the tool with the work piece tends, when the work piece is of thermosoftening material such as glass, to soften the surface, facilitating the engraving, increasing its speed, and imparting a polished aspect to the engraved line, which distinguishes it from the sharp line aspect left by the usual engraving tools. This aspect is novel and agreeable. Temperatures at the tip of the engraving tool appear to attain the softening point of glass, which is in the vicinity of 700 to 900° C. The end of the tool may be armed with a hard, refractory tip, for instance tungsten carbide.

In FIG. 3 is illustrated a mechanical amplifier 13 in a housing 11, the amplifier being reduced to a pointed needle 15a which is in frictional engagement at mid-length with a split ring 30 in a chuck 31, which is screw threaded at end 31a into the housing 11 and at its other end has a chuck ring 31b which encircles the split end 31c of the chuck. The split ring 30, within the split end of the chuck, is held in position on one side by a snap ring 32, seated in a groove 33 in a chuck, and at the other end by a flange on the end of portion 31c. The screw thread between the ring 32 and the split end 31c of the chuck is conical so that screwing it in one direction increases the friction between split ring 30 and needle 15a, and screwing it in the other direction reduces the friction. By this construction it is possible to accurately establish the temperature which is imparted to the needle 15a by the vibrations of low amplitude and high frequency to which the needle is subjected.

The principle of simultaneously doing work by means of a tool, and heating the tool to a favorable working temperature by the heat of friction generated by the relative movement of parts in engagement, at least one of which is vibrated with high frequency and low amplitude, is believed to be new and it is applicable to many uses. The scope of the invention is indicated by reference to a number of dissimilar uses, some of which have been illustrated in the drawings.

In FIG. 4. an elongated anvil 35 receives the overlapped edges of plastic sheets 36, 37. A sealing device having a blade 38 with edge 39 presses the overlapped edges against the anvil. The blade is composed of solid homogeneous material, e.g. Al, Mg, Monel, and its sides are in contact with two blocks 40 of cast iron which constitute rubbing shoes. The blade 38 is attached to a mass of metal 38' which is drilled, as at 41a, to receive bolt 41 which supports plates 42, 43, which grip the shoes 40 between them. Housings 44 contain magneto-strictive transducers which impart vibrations to the block 38' which, acting as a mechanical amplifier, applies vibrations of high frequency and low amplitude to the edges of sheets 36, 37. Simultaneously the edge 39 is heated by the frictional contact with rubbing shoes 40. The overlapped parts of the plastic sheets are sealed by the combined effect of vibrational pressure and heat.

Assuming a given input of power through the transducers the temperature existing at the edge 39 will be the higher the closer it is to the rubbing shoes and the greater the friction between the rubbing shoes and pressure element 38. The cast iron has low heat conductivity so there will be a tendency for the heat to concentrate in the edge 39. The length of shank 38 limits heat flow toward mass 38'.

In FIG. 5 the steel plate 43 is separated from the rubbing shoes 40 by insulating block 45. The shoes 40 are metal of low heat conductivity. The insulation 45 may be of any approved type, for instance cellular ceramic or mica-filled polyvinyl chloride.

FIGS. 6 and 7 are similar except for the shape of the nozzle. These devices are designed for the application by extrusion of stiff, thermosoftening materials such as waxes, resins natural or synthetic, and metals such as solder. The sleeve 50 of the vibratory instrument receives a chuck 51 which is screw threaded in place. The pin 52 on the end of an amplifier 13 passes through a central bore in the chuck without making contact with it and is received in the end of a nozzle 53 in FIG. 6, and 54 in FIG. 7. The pin will, in each instance, be shaped at its end to fit the projection 54' on the end of the nozzle so that the escape of the material from inside the nozzle backward into the bore will not occur. Set screws 55 press the extension 54' against the pin 52 with a pressure corresponding to the setting of the screws, or the screws may pass completely through the part 54' and engage the pin 52. In either case, motion of high frequency and low amplitude occurs between the pin and the contacting parts, and heats the end of the pin. The material which is to pass through the nozzle 53 or 54 may be, for instance, solder or plastic which is thrust into the nozzle through a tube 56. This material would not ordinarily pass through the nozzle because of its stiffness or because of the opposition of capillarity, but under the drive of the vibrating end of pin 52, which is simultaneously heated by the friction, the solder or plastic is softened, becomes fluid in the nozzle 53, 54, has its viscosity and surface tension reduced, and readily passes through orifices which would otherwise offer capillary obstruction because of size as in FIG. 6 or size and configuration as in FIG. 7. There are thus several phenomena involved in FIG. 7, the heating of an operating tool at the point of its application without mediation of electric coils or flame heat, the melting of the material in the nozzle by vibrations of frequencies in or approaching the ultrasonic and the reduction of viscosity, surface tension, and capillarity by the heat and the vibrations.

The principles set forth in the description of FIGS. 6 and 7 are applicable to the liquification of stiff fluids as well as to the melting of solids, being effective to reduce their viscosity and to break the capillary effect which would otherwise entrap them in the nozzle. The operating tool is, of course furnished with off-on switches which activate it as needed, limiting the use of power to the actual periods of work and eliminating the continuous application of power to the generation of heat which was previously necessary in such tools. The application of pressure to the material being sent through tube 56 is either unnecessary or of slight order because the vibrating tool appears to create cavitation and to act as a driving force to keep the material flowing through the nozzle. The heating of the pin by the friction is almost instantaneous so that delays in attaining operating temperature between off and on positions are slight in any case and are rendered negligible by the heat-retaining characteristics of the pin.

The foregoing principles are not limited to instruments for the application of minute forces to minute ends but may be applied with equal success to large scale machinery such as the application of ink to a printing roller, which is illustrated in FIG. 8.

In FIG. 8 a printing roller 60, rotating in the direction of the arrow, makes contact with a sheet 61 of printable material, for instance a length of wallpaper. The roller may be presumed to have etched upon its face the design of the wallpaper to which ink 62 from the trough 63, is to be applied. This ink is in a state sufficiently fluid, according to FIG. 8, to flow through the elongated delivery nozzle 64 on to the doctor blade 65 which is constructed with a comparatively thin section adjacent its edge of application and a comparatively thick part 65' remote therefrom. Its thick portion is supported in a frame 66 by screws 67 which are located at each end. Mounted in back of 65' are a group of transducers 68 only one of which is diagrammatically indicated. These apply an initial vibration of limited amplitude to the back of a doctor blade and these are magnified by the blade itself which acts as a mechanical amplifier. This may provide a vibration at the surface of the roller 60 of a few ten-thousandths to a few thousandths of an inch. The nozzle 64 which delivers the ink to the upper surface of the doctor blade is separated from the roll by a rubbing bar 69 which is supported at its ends for vertical adjustment (not shown) and has in its contacting edge a series of apertures 70 which permit the ink from the nozzle 64 to pass through it and reach the edge of the blade 65 where it is applied to the roller. The blade may be composed of copper, tungsten carbide, or boron carbide, and rubbing bar 69 may be of cast iron. The applicator edge of the doctor blade is heated by high frequency rubbing against the teeth of rubbing bar 69, that is to say against the portion on opposite sides of the apertures, so that the fluidity of the ink is improved by the vibration and the heat and it is applied to the roller in the most perfect condition of viscosity. A particular advantage of this part of the invention is that solid or semi-solid printing inks may be used with the same facility which has previously been characteristic only of inks of low viscosity and high fluidity. Blade 65 is reciprocated moderately along the roller.

In FIGS. 9 and 10 are inventions related to the application of coating materials such as wax and plastics to web material such as paper, cloth, or wire.

In FIG. 10 it will be presumed that a sheet of paper 75 is being coated with polyethylene plastic 76 as it passes over a roller 77. In making this invention we discover that ordinary nickel lamination may be bent or distorted into a wide variety of shapes and in each case can be excited into vigorous ultrasonic vibration by a driving coil. This is shown in FIG. 9, in which a trough 78 is shaped of nickel and provided with a nickel delivery conduit 79; a driving coil 80 is mounted around the upper part of the trough and is excited by a basic flow of direct current supplemented by a superimposed alternating current. The magnitude and characteristics of such currents is set forth in prior applications and patents of this assignee and need not be given here. The upper part of the trough is fixedly mounted and the conduit 79 is allowed free to vibrate. Mounted in contact with the bottom of the conduit are cast iron rubbing bars 81, 82 which have faces in contact with the nickel of the conduit. As the conduit vibrates in accordance with the ultrasonic frequencies imposed on it the nickel is heated, transmits its heat to the plastic material 76, lowers its viscosity and surface tension both by thermal effect and vibrational effect and applies it to the surface of the paper. The heat is generated at the point of application and is consumed there. No heating apparatus of prior art type is employed. The temperature of the plastic can be raised by pressing the rubbing bars more tightly against the conduit and can be lowered by reducing the pressure of the bars. A calendar roll 75' imparts finish by pressing the coated material against roll 77.

In FIGS. 11 and 12 are shown the construction of a preferred form of spot heater which is particularly useful as a soldering iron. In this figure a tubular handpiece 90, having a cap 91 at one end and a tubular grip 92 at the other end, receives a coil 93 between the tube 90 and inner tube 94. The grip 92 is provided with a cylindrical projection 92' which receives sealing rings 95 in circumferential grooves 96. A nickel laminate transducer 97 is supported within the coil by supports 98 which are preferably located at a node. The coil is supplied by D.C. and A.C. simultaneously in accordance with known principles. Cooling water is supplied to the interior of the handpiece through pipes 99, 100 and current is fed to the coil through leads 101, 102 all of which are sealed within the cap 91.

Attached to the end of the transducer bar 97 is a mechanical transformer 103 having one reduction in size 104 and a second 106 to which the tip 107, of copper in the case of a soldering iron, is attached. The mechanical transformer acts in a known way by nodes and loops to establish the magnitude of the minute reciprocations of the tip. A tube 108 is brazed to part 103 and extends over the reduced section in spaced relation to it. The tube is supported by sealing rings 109 which are held in inner circumferential grooves in the grip 92. The grip may be of plastic of low heat conductivity.

Mounted in the grip 92, for instance by a screw thread, is a retainer head 110, having a set screw 111 bearing on sleeve 108 and thus having power to bias the mechanical transformer toward the opposite side of the retainer head. Mounted in a slot 112 in the part 106 is a cast iron friction shoe which bears against a frictional surface 113 of heat insulating type, for instance porcelain, with a pressure that is established by set screw 111. The frictional insulator is mounted in the part 110 in alignment with the friction shoe.

In the modification of FIG. 12 the grip 92 is screw threaded at 120 to receive a threaded sleeve 121 having screw 111 bearing on sleeve 108. The sleeve 121 has a projection 122 which supports the frictional insulator, leaving the parts 105, 106, 107 exposed. The insulator confines the heat of friction largely to the tip.

In FIG. 13 is shown a modified form of the device of FIG. 4 which employs some of the principles of FIG. 11. This is a broad bladed device which may be used for operations such as sealing or for making long attachments by solder. It involves an input section 130 which is activated by a plurality of transducers 131 mounted in tubular recesses. The mechanical transformer 132 is supported by compression strips 133 mounted in grooves which extend transversely of and within the shields 134, 135 which are attached by flanges 136, 137 to mounting blocks 138, 139 which form a part of a casing which encloses the transducer and supports the activating coil. As the general principle of this construction has been set forth in FIG. 11 it is not duplicated here. A plurality of set screws 111 bear upon the mechanical amplifier 132 and can be used to control the friction of the shoe 112 with the insulator 113. The shoe and the insulator extend throughout the width of the blade and are mounted similarly to the construction of FIG. 11.

In the soldering iron of FIG. 1 heat is generated within the tip itself. In the soldering iron of FIG. 11 the heat is generated outside the tip and is transmitted to it by conduction. In the form of FIG. 12 there can be a heat loss from sections 105 and 106, but this is not undesirable under some circumstances. In the device of FIG. 11 the loss of heat is minimized by the shield 110.

In FIGS. 7 and 14 the stiff material is fed into a hot tip. In FIG. 7 the tip is heated internally by the vibrations of part 52, which also, to some extent, acts as an impeller. The tip 54 does not vibrate as a part of the piston 52, being rigidly attached to the sleeve 50. In FIG. 14 the nozzle 140 is supplied through a tube 56, as in FIG. 7, but the nozzle itself is firmly attached to the output end 105 of a transducer and is vibrated in contact with a frictional element 112 which is fixedly attached to an insulator 113, which is in turn supported on a projection 122, as in FIG. 12. In this case the heat is generated by the friction of the nozzle 140 against the cast iron shoe 112. There is thus a difference between FIG. 11 and FIG. 12, in which the metallic shoe vibrates with the transducer and FIG. 14, in which the shoe is fixed.

In the form of the invention shown in FIGS. 11 and 12 the shoe may be of metal having high heat conductibility and the insulator 113 may be composed of an object developing adequate friction in contact with the shoe. The metal shoe and the insulator can be given whatever thicknesses are useful and that conformation which contributes best to the heat sought. The frictional contact areas can be increased by conforming the contacting surfaces to shapes other than a straight line. For instance, the rubbing shoe 112 in FIG. 14 can be made semi-circular and the lower surface of the nozzle 140 can be shaped to conform to it.

The set screws 111 will normally be located at a node where there is substantially no longitudinal motion of the mechanical amplifier.

In applying the invention to fine work, such as soldering minute parts, one may use conduits of hypodermic needle size for delivery, bearing in mind that some hypodermic needles may have substantial cross section. The needles may have any interior shape such as circular, square, triangular, or they may be of irregular outline, such as cruciform.

It is frequently possible to apply the vibration to either or both of the frictional elements. This may be illustrated in FIG. 8 where transducers applied to the ends of the bar 69 would assist in the heating and flowing of the ink.

The tip of the applying instrument may be aligned at any angle to the work, from right angles to the surface being worked to parallel to it. Any angle of application and any direction of forces may be used.

It has been very difficult to weld fine leads successfully but the present invention has produced an improvement in that technique. This was accomplished by joining two wires by a piece of transparent adhesive tape then welding the fine leads directly through the tape by means of a welding tool constructed similarly to FIG. 3. The invention has also been used in a micro-manipulator to weld fine, tin coated copper wire to a brass base, the attachment being practically instantaneous. In that case the motion of the welding tip was parallel to the brass surface onto which the wire was welded.

A small soldering tip to be used in micro-technology involves a copper tip which is brazed to a cast iron (non-tinning), or other low-Q block, a vibrator, and a rubbing element of ceramic, preferably of variable pressure.

The characteristics of the new device are that there must be two surfaces in contact, with a gross relative production of rubbing friction and this must be generated in operative proximity to the point of application. The rate of heating is dependent from the area of rubbing, the length of the stroke, the frequency, and the masses of the rubbing elements, together with their relative heat conductivities, and the use of insulation.

There are many and major advantages of the invention, among which are these:

The coating technique and the apparatus for coating are improved. Another advantage is in welding, brazing and soldering, that is to say in the joining of different elements by a hardening binder. Yet another advantage is in the generation of heat at the point of use by means which are free of heating devices of flame and electrical type. Another advantage is the combination of frictional heat with vibrations of ultrasonic type at the point of use. Yet another advantage is the lowering of surface tension and viscosity to a select level in a fluid at its point of application. Another advantage is in facilitating the transformation of stiff or solid materials to the fluid state and improvement in states of fluidity. Another advantage is in improving extrusion techniques in micro and standard sizes. Other advantages are in the generation of heat at the point of use, and in the use of vibrations of low amplitude and high frequency at the place of use to agitate and act upon a substance and to generate heat to affect the state of the substance agitated.

As many apparently widely different embodiments of the present invention may be made without departing from the spirit and scope thereof, it is to be understood that the invention is not limited to the specific embodiments.

What is claimed is:

1. Apparatus for generating and transferring heat comprising a pair of frictionally engaged, relatively movable elements, means to rub one against the other with small amplitude and high frequency, one of said elements having low heat conductibility and the other having high heat conductibility.

2. Apparatus comprising an element, means mounted so as to have frictional sliding engagement with the element, and means to vibrate at a high frequency and low amplitude at least one of the elements and the means having frictional sliding engagement therewith, relative to the other, so as to generate substantial heat at the zone of such frictional engagement.

3. Apparatus as claimed in claim 2, wherein the vibrating element vibrates at an ultrasonic frequency.

4. Apparatus as claimed in claim 2, comprising means for adjustably pressing the member and the frictional means together.

5. Apparatus as claimed in claim 2, comprising heat insulating means mounting the means having frictional sliding engagement with the member, whereby substantially to confine the generated heat to the member and the means.

6. Apparatus comprising a member, means for vibrating the member at a high frequency and low amplitude, and means mounted so as to have frictional sliding engagement with the member as it vibrates so as to generate substantial heat at the zone of engagement between the vibrating member and the means frictionally engaging the member.

7. Apparatus comprising a supporting structure, a member mounted on the supporting structure, means for vibrating the member with respect to the supporting structure at an ultrasonic frequency and low amplitude, and means mounted against movement in the direction of vibration of the member pressed against and having frictional sliding engagement with the member so as to generate substantial heat at the zone of engagement between the vibrating member and the means frictionally engaging the member.

8. Apparatus as claimed in claim 7, wherein the means having frictional sliding engagement with the member is fixedly mounted against movement in the direction of vibration of the member.

9. Apparatus as claimed in claim 7, wherein the means having frictional sliding engagement with the member is disposed outwardly of the member and engages at least one outer surface thereof.

10. Apparatus coprising an element of good heat conductivity having a heat applying working zone, friction means mounted so as to have frictional sliding engagement with a part of the element at a location adjacent the heat applying working zone thereof, and means to vibrate at a high frequency and low amplitude the element and the means having frictional sliding engagement therewith relative to each other in the direction of sliding therebetween so as to generate substantial heat at the zone of such frictional engagement and to transmit the generated heat to the heat applying working zone of the element.

11. Apparatus as claimed in claim 10, wherein the element has a passage therein, the passage receiving the friction means, at least a portion of the wall of the passage having frictional sliding engagement with the friction means.

12. Apparatus as claimed in claim 10, wherein the friction means is disposed outwardly and laterally of the element.

13. Soldering apparatus comprising an element of good heat conductivity having a soldering tip, friction means mounted so as to have frictional sliding engagement with a part of the element at a location adjacent the soldering tip thereof, and means to vibrate at a high frequency and low amplitude the element and the means having frictional sliding engagement therewith relative to each other in the direction of sliding therebetween so as to generate substantial heat at the zone of such frictional engagement and to transmit the generated heat to the soldering tip of the element.

14. Apparatus as claimed in claim 13, wherein the eleemnt has a passage therein, the passage receiving the friction means, at least a portion of the wall of the passage having frictional sliding engagement with the friction means.

15. Apparatus as claimed in claim 13, wherein the friction means is disposed outwardly and laterally of the element.

16. Apparatus as claimed in claim 15, comprising heat insulating means mounting the means having frictional sliding engagement with the element, whereby substantially to confine the generated heat to the element and the means having frictional sliding engagement therewith.

17. Apparatus as claimed in claim 13, wherein the element is vibrated, and comprising means to maintain the friction means fixed from appreciable vibration with the element.

18. Apparatus as claimed in claim 13, wherein the friction means is vibrated, and comprising means to maintain the element from appreciable vibration with the friction means.

References Cited
UNITED STATES PATENTS

| | | | |
|---|---|---|---|
| 2,470,741 | 5/1949 | Gordon. | |
| 2,637,535 | 5/1953 | Arnold | 106—309 |
| 3,022,814 | 2/1962 | Bodine | 264—68 |
| 3,194,855 | 7/1965 | Jones et al. | 264—70 |

CHARLES J. MYHRE, *Primary Examiner.*